United States Patent [19]

Gyugyi

[11] 4,307,331

[45] Dec. 22, 1981

[54] HYBRID SWITCHED-CAPACITOR CONTROLLED-INDUCTOR STATIC VAR GENERATOR AND CONTROL APPARATUS

[75] Inventor: Laszlo Gyugyi, Pittsburgh, Pa.

[73] Assignee: Westinghouse Electric Corp., Pittsburgh, Pa.

[21] Appl. No.: 942,839

[22] Filed: Sep. 15, 1978

[51] Int. Cl.³ .......................... H02J 3/18; G05F 1/70
[52] U.S. Cl. ..................................................... 323/210
[58] Field of Search ............... 323/102, 105, 119, 210, 323/211

[56] References Cited

U.S. PATENT DOCUMENTS

| | | | |
|---|---|---|---|
| 3,936,727 | 2/1976 | Kelly, Jr. et al. | 323/102 |
| 3,999,117 | 12/1976 | Gyugyi et al. | 323/119 |
| 4,047,097 | 9/1977 | Gyugyi et al. | 323/119 |
| 4,104,576 | 8/1978 | Frank | 323/105 X |
| 4,139,723 | 2/1979 | Havas | 323/105 X |

Primary Examiner—William M. Shoop
Attorney, Agent, or Firm—M. J. Moran

[57] ABSTRACT

A control system for a VAR generator is taught in which a thyristor controlled inductive element is used to provide lagging VAR's and a bank of parallel capacitors, each of which may be switched into and out of circuit cooperation independent of the other, is used to provide discrete levels of leading VAR's. The inductive element is utilized in conjunction with the discrete levels of leading VAR's to provide a continuum of VAR generation in the region between the discrete levels by providing continuously variable compensating or cancelling current for interaction with the discrete levels to provide an overall continuous range of VAR generation in the leading VAR region.

6 Claims, 16 Drawing Figures ance are required. An improvement of the aforementioned system includes utilization of an inductive branch and a capacitive branch in which the inductive branch operates independently of the capacitive branch and vice verse. In this sytem at standby, neither the inductive portion of the system or the capacitive portion of the system conducts appreciable current and therefore the standby losses are lower than in the aforementioned system. Net inductive current is provided by using the inductive portion of the system exclusively; and net capacitive current is provided by using the capacitive portion of the system exclusively. However, a problem is present with this kind of system in that the use of a capacitive branch is not conducive to continuous switch control over a wide range of capacitive currents as is the use of an inductive branch. In the prior art therefore, the capacitive portion of such a system utilizes a bank of discrete capacitors with each having a separate switch. The net capacitive reactance for capacitive VAR production is provided by judiciously picking cominations of capacitors in the bank of capacitors to provide discrete values of capacitance. As mentioned however, such a system has the inherent disadvantage of only allowing discrete values of capacitive current to be produced. Thus, control over a continuous range is difficult if not impossible. In the range of capacitive VAR demand, only a relatively few values of capacitive current are available. As a consequence, VAR compensation or correction in the capacitive range is at best an approximation. It would be advantageous therefore, if a system could be found which utilized continuous VAR control in both the capacitive and inductive regions, but in which stand-by losses were minimized and in which the relative size of the inductive and capacitive components could be reduced below the previously discussed minimum for a given range of correction. It would be further advantageous if the control arrangement for such a system were such as to provide continuously variable VAR output and fast transient response.

HYBRID SWITCHED-CAPACITOR CONTROLLED-INDUCTOR STATIC VAR GENERATOR AND CONTROL APPARATUS

CROSS REFERENCE TO RELATED APPLICATIONS

The subject matter of this invention is related to other inventions taught in concurrently filed copending applicaion Ser. No. 942,837, entitled "Static VAR Generator With Discrete Capacitive Current Levels".

BACKGROUND OF THE INVENTION

The subject matter of this invention relates generally to VAR generators and relates more specifically to VAR generators of the type employing banks of switchable fixed capacitors utilized in conjunction with switch controlled inductors for producing positive and negative VARS. It is known to make VAR generators by connecting a fixed capacitor and a switched inductor in parallel across two lines of an electrical system which is to be regulated or controlled by the VAR generator. A suitable control system is provided for sending an output signal to the switch portion of the switched inductor to establish a conduction interval therefor during a predetermined period of time. The conduction interval allows current to flow for a portion of the predetermined period of time thus generating an inductively reactive current which interacts with fixed capacitively reactive current to produce a net reactive current which cooperates with the voltage across the lines to produce reactive power. Th predetermined interval of time is usually one-half cycle of the line voltage. Consequently, on a half cycle by half cycle basis, the switching interval can be changed to provide differing amounts of reactive power as is determined is necessary by the calculating control portion of the system. Systems of the previous type can be found in U.S. Pat. No. 3,936,727, issued Feb. 3, 1976 to F. W. Kelly, Jr. and G. R. E. Laison, and U.S. Pat. 3,999,117, issued Dec. 21, 1976 to L. Gyugyi et al. The latter patent is assigned to the assignee of the present invention. The values of capacitance and inductance are usually chosen in the prior art so that at a moderate conduction interval for the switched capacitor, the produced inductive current is approximately equal to the fixed capacitive current thus producing zero VARS. Consequently, if the conduction interval is increased, the amount of inductive current increases producing a net inductive reactive current. On the other hand, if the conduction interval is decreased, the inductive current is decreased producing a net capacitive reactive current. This capability gives positive and negative VAR capability to the system. A system of this type has a number of problems, however. One problem lies in the fact that at a stand-by condition or of a condition where no VAR generation is required, appreciable power generation may be required in each of the inductive and capacitive components of the system. Said in another way, in a system of the type previously mentioned, significant inductive current is generated at a time when no VAR correction or production is required because the significant inductive current is utilized to cancel the oppositely phased significant capacitive current. This means that there are relatively high stand-by losses. Furthermore, for any given amount of maximum VAR correction either negative or positive, minimum values of capacitance and induct-

SUMMARY OF THE INVENTION

In accordance with the invention, a continuous range of VAR correction which covers both negative and positive VAR generation and which has minimum stand-by losses and uses relatively small components for a given range of correction is disclosed. In particular, an inductive apparatus and a capacitive apparatus are utilized in conjuction in such a manner that the inductive apparatus provides essentially the entire VAR generation for net inductive VAR demand. On the other hand discrete capacitors are utilized in conjuction with the same inductive apparatus to provide VAR generation over a continuous range for net capacitive VAR demand. The latter is accomplished by switching in individual capacitors or cominations thereof from a bank of capacitors thus providing a discrete level of capacitive current from which is subtracted any one of a continuum of inductive currents provided by the inductive portion of the circuit to thus produce a continuous range of capacitive VAR generation. A control system is provided for accomplishing the aforementioned purposes. The control system includes an open loop path which senses when VAR correction is necessary and provides an error signal related proportionally to the amount of VAR correction necessary. The error signal is then utilized in appropriate decision making portions of the open loop control system to set the firing angle for the inductive portion of the control system and to select the correct number of appropriate capacitors for the capacitive portion of the control system. Furthermore, the control system has a feed forward portion which is interconnected with the capacitive portion and the inductive portion. The feed forward portion is utilized to determine the conduction angle of the inductive portion of the system when it is utilized as a fine tuning apparatus. That is, when the capacitive portion of the system is used in a discrete manner to produce discrete levels of capacitive VARS.

BRIEF DESCRIPTION OF THE DRAWINGS

For a better understanding of the invention, reference may be had to the preferred embodiments thereof shown in the accompanying drawings in which.

DESCRIPTION OF THE PREFERRED EMBODIMENTS

Figure 1:
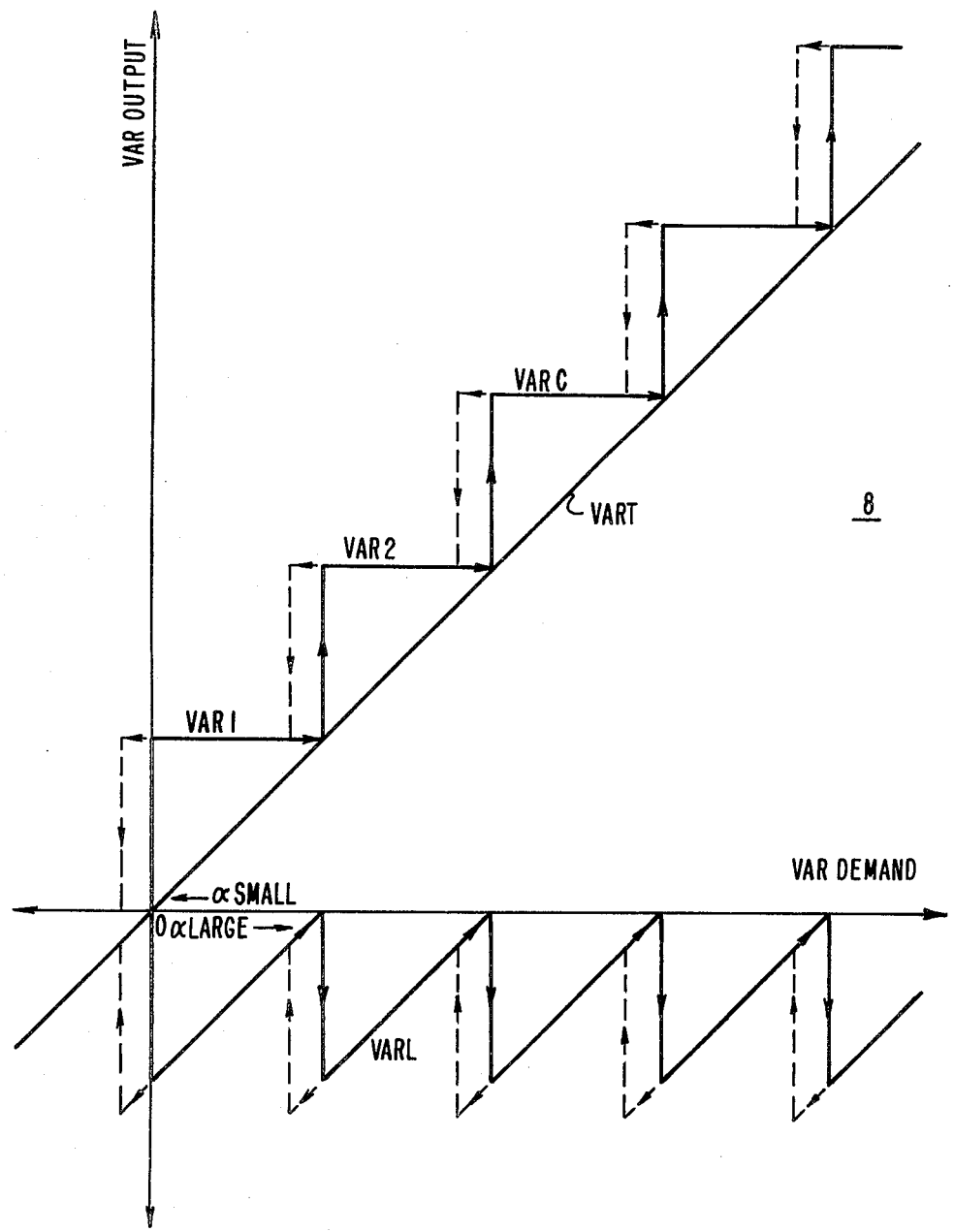
FIG. 1 shows a plot of VAR demand versus VAR output for the apparatus of the present invention.
Figure 2:
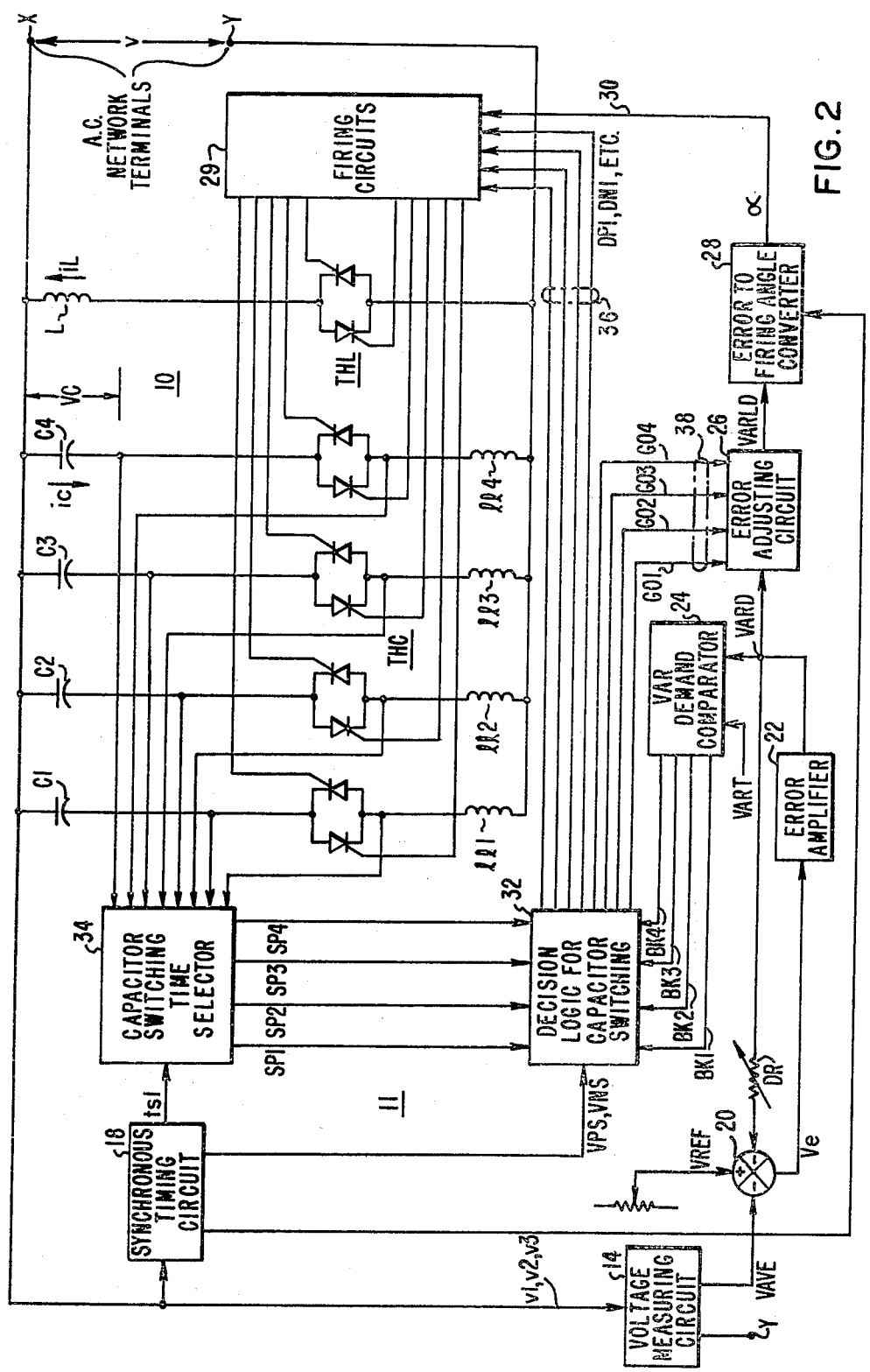
FIG. 2 shows a static VAR generator and control system therefor embodying the teachings of the present invention.

Referring now to the drawings and FIG. 1 in particular, a plot of VAR output versus VAR demand is shown for an apparatus having the capability for both negative and positive VAR generation. Apparatus whose characteristics may be represented by the plot of FIG. 1 may be of the kind described in copending application Ser. No. 942,837. Apparatus of that type is also shown in FIG. 2 of the present invention. The apparatus in question has the characteristic of reactive current generation over a continuous range in the inductive region and in the capacitive region. However, in the capacitive range, continuous control is provided by a combination of discrete capacitive control and inductive fine tuning control. In the plot of FIG. 1, VAR demand is considered negative to the left while VAR demand is considered positive to the right. In a like manner to the top of FIG. 1, VAR output is considered positive while to the bottom of FIG. 1, VAR output is considered negative.

Figure 4:
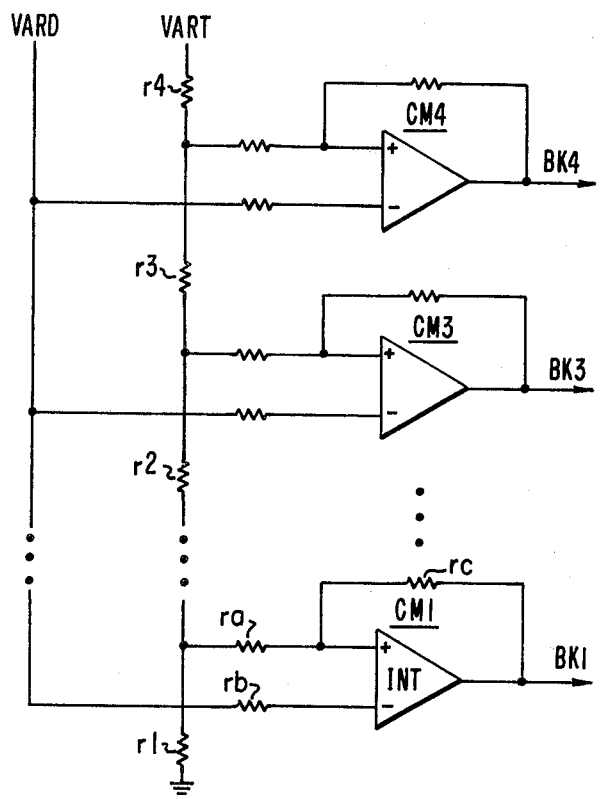
FIG. 4 shows a block diagram arrangement for the "VAR demand comparator" of FIG. 2.
Figure 5A:
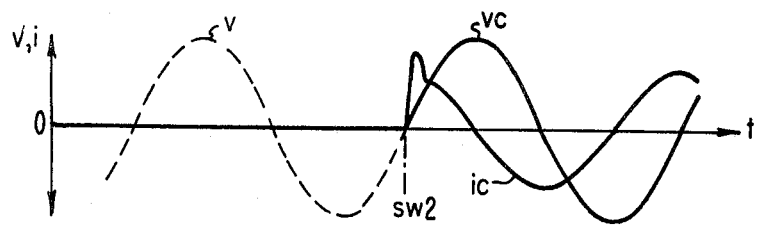
FIGS. 5A through 5E show plots of line voltage, capacitor voltage and capacitor current versus time for important switching points for the capacitors of FIG. 2.
Figure 5B:
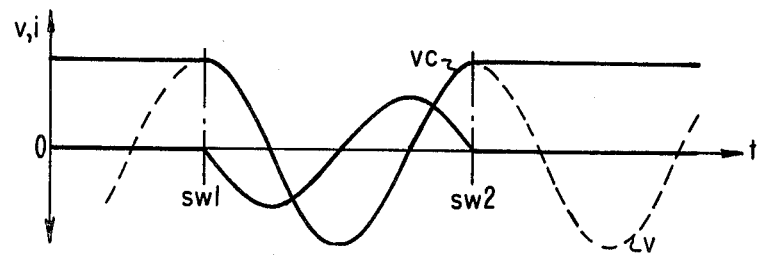
Figure 5C:
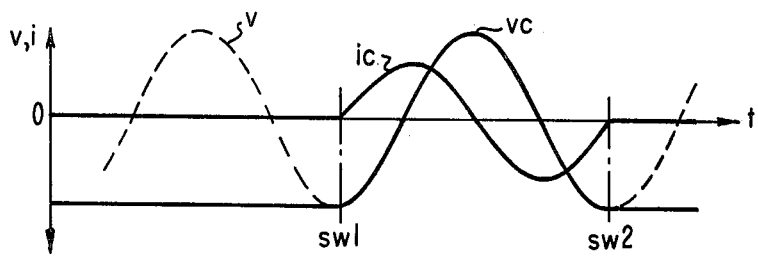
Figure 5D:
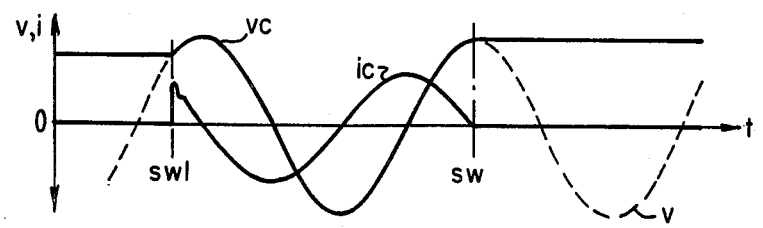
Figure 5E:
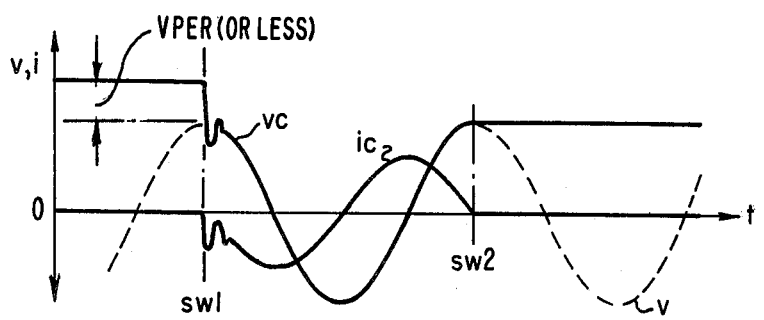

In the ideal situation, VAR output equals VAR demand and the line VART represents such an ideal situation. This means that as circuit conditions change from a disposition in which no VAR correction is required to a disposition in which VAR correction is required or desired, the control system (to be described hereinafter) will operate to calculate the VAR demand for example, to provide appropriate signals for various other portions of the VAR producing circuit, and to produce a VAR output which is ideally equal to VAR demand as is shown in FIG. 1. In actuality, the matching of VAR output with VAR demand in the inductive region shown in the lower left quadrant of FIG. 4 is relatively easily obtainable because of the continuously controllable nature of inductive current as described in the prior art. However, because of the discrete nature of VAR compensation with respect to capacitive elements, VAR generation in the region shown in the upper right portion of FIG. 1 is more difficult. In this case, an appropriate controller senses the time for positive VAR correction and switches in a capacitor to provide a net level of capacitive VAR correction, VAR 1, for example, even though the demand for VAR correction in this region may be significantly less than VAR 1. If the capacitive element were the only element available for VAR correction as is the case in the prior art, the system would have to operate with larger VAR correction than is necessary, thus introducing undesirable error. However, the present invention utilizes the inductive element with its phase back control to compensate for the difference between the actual amount of VAR demanded and that which is produced by the discrete capacitor. Each of the levels VAR 1, VAR 2, etc., shown in FIG. 1, represents a fixed level at which reactive current may be produced in the reactive current region of FIG. 1. Any other reactive current desired must be produced by reducing some of the discrete reactive current by subtracting an appropriate amount of inductive current as determined by a firing angle for a thyristor which is connected in series circuit relationship with the inductive element. The sawtoothed shopped inductive current shown to the bottom right of FIG. 1 represents ranges for continuous control of inductive current. The ranges exactly correspond to the brake points in the discrete levels of capacitive current. Thus, it can be seen that VAR generation in the capacitive region over a continuous range is possible with apparatus that embodies the principles illustrated by FIG. 1.

Referring now to FIG. 2, a VAR generator system 10 is shown. The VAR generator system 10 is connectable at terminals X and Y to two lines of an electrical system across which the voltage v is present. In this embodiment of the invention, the only means of communication with the electrical system is provided at the terminals X and Y although that is not limiting. The production of VARS or volt amps reactive, is useful for many purposes in an electrical system. It tends to be very good for voltage compensation among other things. In another instance, the network voltage v may drop or rise from a nominal ideal value as load conditions change in the electrical system. Change in the voltage v beyond a certain predetermined tolerance range is undersirable in an electrical system. The VAR generator may produce sufficient reactive current or reactive power to compensate for the change in the voltage thus boosting it when it has fallen or reducing it when it has risen. The production of the reactive curent is dependent upon VAR generating apparatus which usually includes capacitive elements and inductive elements and a control system for firing the various elements or introducing them into the circuit on half cycle by half cycle intervals in accordance with a recently calculated VAR demand. In this particular embodiment of the invention, the control system 11 includes a voltage measuring circuit 14, a synchronous timing circuit 18, an error generator 20, an error amplifier 22, a VAR demand comparator 24, an error adjusting circuit 26, an error to firing angle converter 28, and firing circuits 29. In addition a decision logic for capacitor switching circuit 32 and a capacitor switching time selector 34 are also provided. The elements are interconnected with each other and with the various capacitors, inductors and switches of the VAR generator circuit 10 in the following manner. The voltage measuring circuit 14 is interconnected with the terminals X and Y to measure phase voltages v1, v2 and v3, for example, in the case of a three phase electrical system and to provide an output VAVE which is somehow related to them. The voltage measuring circuit 14 therefor comprises the input threshold logic control device for the circuit. It may in other embodiments of the invention include a current measuring circuit, a power measuring circuit, or the like. Its principal function is to provide an output which is related to AC network variables and from which an error signal can be derived. In conjunction with the latter point, the VAVE signal from the voltage measuring circuit 14 is provided to the negative input of an error generator 20. To the positive input thereof is provided a predetermined reference signal VREF. These signals are added algebraically to provide an error signal Ve. The error signal is provided to an error amplifier 22 from which a enlarged error signal VARD is produced. The enlarged error signal VARD is proportional to the error signal Ve. The output of the error amplifier 22 is provided simultaneously to the three places. The output is provided by way of a droop resistor DR to another negative input terminal of the error generator 20 for closed loop feedback. The droop resistor DR may be adjusted to provide an appropriate droop range for the voltage. The output of the error amplifier 22 is also provided to a VAR demand comparator 24 and to an error adjusting circuit 26. The VAR demand comparator compares the VAR demand signal VARD with a reference signal VART which may be derived from a fixed voltage or from a controlled voltage which is dependent upon network variables. Apparatus 24 provides outputs BK1 through BK4, each of which is related to firing signals for fixed capacitors. These signals are in turn provided in tandem to the decision logic for capacitor switching circuit 32. This circuit compares the descrete levels of VAR demand signals BK1 through BK4 with signals SP1 through SP4 from the capacitor switching time selector 34 and with signals VPS and VNS from the synchronous timing circuit 18. Two sets of output signals are provided from the decision logic for capacitor switching 32. One set of outputs, represented by the lines 36, may be considered the closed loop signals DP1, DN1, etc. These signals are provided to the firing circuits 29 for actuation of the switches THC for appropriate capacitors C1, C2, C3 or C4. The other set of output signals from the decision logic capacitor switching 32 is represented by the lines 38 upon which the signals G01 through G04 are present. This may be called the feed forward portion of the control circuit. These latter signals are provided as one set of inputs to an error adjusting circuit 26. The other input of error adjusting circuit 26 is the VAR demand signal VARD. The output from the error adjusting circuit 26 is the adjusted error signal VARLD. This signal is provided to the error to firing angle converter 28 which cooperates with the synchronous timing circuit 18 to provide an output signal $\alpha$ on the line 30 which in turn is provided to the firing circuits 29 for controlling the phase back or conduction angles as the case may be of the thyristor switches THL for the inductor L. The capacitor switching time selector 34 is interconnected to measure the voltages across the switches THC so as to provide the output signals SP1 through SP4 in conjuction with the output signal TS1 from the synchronous timing circuit 18. Essentially, the capacitor switching time circuit 34 picks the appropriate instant of time based on the voltage conditions across the capacitors C1 through C4, for example, for firing the capacitors in the most efficient transient free way in accordance with the status of the signals BK1 through BK4. The synchronous timing circuit 18 may be similar to the synchronous timing circuit taught in the previously mentioned U.S. Pat. No. 3,999,117. The synchronous timing circuit 18 provides the time reference base for the operation of the entire static VAR generator 10. It has an input which is interconnected with the terminals X and Y for utilizing the AC network terminal voltage v in the preferred embodiment of the invention as the basic timing reference for all of the operations of the controller of the static VAR generator 10.

FUNCTIONAL OPERATION OF THE VAR GENERATOR 10

Referring concurrently to FIGS. 1 and 2, it can be seen that the static VAR generator 10 has three modes of operation. The first mode of operation may be called the exclusive inductive current production mode. This mode of operation corresponds to the VAR generator activity depicted in the lower left quadrant of FIG. 1. In this case, net inductive current is required and the inductor L of FIG. 2 is utilized exclusively for producing the inductive current. The voltage measuring circuit 14 produces an output signal VAVE which is compared with the VREF signal by the error generator 20. The output signal Ve therefrom is provided to the error amplifier 22 from where it is passed through the error adjusting circuit 26 in a generally unchanged state to produce the signal VARLD. This latter signal is fed to the error to firing angle converter 28 where it produces an appropriate firing angle $\alpha$ for the firing circuits 29. Since no capacitive action is required at this time, the firing circuit 29 fires the thyristor gates THL during appropriate half cycles to allow current iL to flow through the inductor L during appropriate half cycles of voltage v to thus provide net inductively reactive current for compensating the voltage between the terminals X and Y. In the next mode of operation, the error amplifier provides the signal VARD which is oppositely signed from the signal VARD produced during the situation where inductive reactive current was desired. In this case, the signal VARD is operated upon by the VAR demand comparator 24 and provides appropriate signals BK1 through BK4 to the decision logic for capacitor switching block 32. At an appropriate time, when the voltages across the capacitive elements C1 through C4 are in a proper dispositon for firing, the capacitor switching time monitor 34 will alert the decision logic for capacitor switching module 32 of this fact by way of the signals SP1 through SP4. When the line voltage v is in an appropriate disposition as determined by the synchronous timing circuit 18, the decision logic for capacitor switching module 32 will provide appropriate signals DP1, DN1, etc. to the firing circuits 29 for actuation of the appropriate thyristor switches THC to switch the properly determined number of capacitors C1 through C4 into parallel circuit relationship with the terminals X and Y to thus produce a discrete level of reactive current IC. In the event that the discrete level of reactive current IC chosen is exactly equal to the current sufficient to satisfy the VAR demanded as determined by the VAR demand comparator 24, no further action will be required in the static VAR generator 10. However, the latter event is statistically unlikely. What is more likely is that the third mode of operation will be utilized in which the appropriate VAR demanded will require a capacitive current which is somewhere between the various discrete levels available through all of the combinations of capacitors C1 through C4. If this is the case, the decision logic for capacitor switching circuit will supply a signal by way of line 38 to the error adjusting circuit 26 which in turn will produce the signal VARLD which is fed to the error to firing angle converter 28 which in turn provides an appropriate signal for angle α on the line 30 to thus fire the thyristors THL to cause the inductor L to conduct. This is sufficient to cause a component of inductive current to flow which will cancel a portion of the fixed capacitive current thus producing the exact amount of capacitive current, within limits, for producing the amount of capacitive VARS which are equal to the VARS demanded as called for by the error amplifier 22. In summary therefore, it can be seen that in the negative, that is the inductive range of VAR demand, all capacitor banks are switched off and the inductive VAR is varied by the usual method of phase control of the reactor or inductor L. As the VAR demand becomes positive, that is capacitive, the first capacitor bank is switched in and the reactor is phase controlled to absorb surplus capacitive VARS and thus to provide the VAR output required. When the VAR demand exceeds the rating of the first, second, third, etc. capacitor banks, the second, third, fourth, etc. capacitor bands respectively are switched in and the inductor bank is controlled each time so as to make the VAR output generally equal to the VAR demand. To ensure that the capacitor banks are not switched in and out in an oscillatory manner above the scheduled switching points, an appropriate hysteresis is provided between the VAR demand values and the places where switching in and switching out actually takes place as illustrated in FIG. 1. This requires that the rating of the inductor reactor bank be higher than that of the single capacitor bank but is deemed necessary in one embodiment of the invention to provide the hysteresis function. Examination of FIG. 2 will show that the control arrangement depicted therein provides the following main functions. It determines how many capacitor banks are to be switched in or out to approximate the compensation VAR demand with the positive (Capacitive) VAR surplus. It determines which capacitor banks can be switched at the switching instance defined for minimum transient disturbance. It determines the inductive VARS necessary to absorb the surplus capacitive VARS provided by the capacitor banks in order to make the VAR generator and the VAR demand equal and it provides an overall closed loop control for the VAR output so as to match the compensating requirement of the AC network. Consequently, it can be seen that the above circuit provides both closed loop and feed forward control utilizing the same apparatus where necessary in each case.

Figure 3:
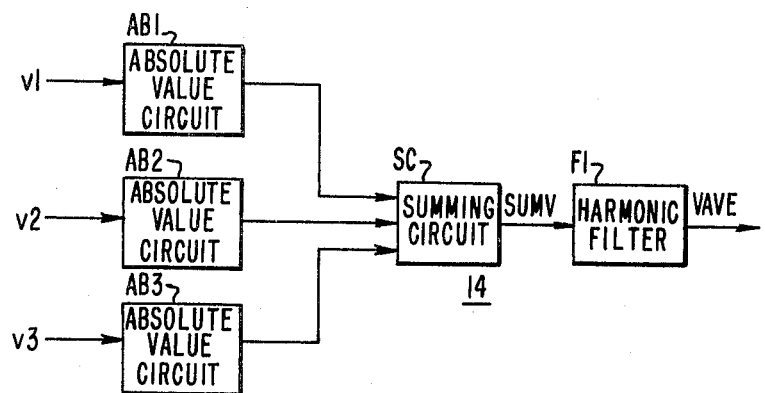
FIG. 3 shows a block diagram arrangement for the "voltage measuring circuit" of FIG. 2.

Referring now to FIG. 3, a functional block diagram useful for accomplishing the purposes of the voltage measuring circuit 14 is shown. In this case, three absolute valve circuits, AB1, AB2 and AB3 are supplied with three inputs, v1, v2 and v3, respectively (in a three phase situation). In a situation shown in FIG. 2, only one of the circuits would be necessary as only one voltage v is shown. The three signals are supplied to a summing circuit SC where they are added to produce a summed voltage SUMV. This is provided to a harmonic filter F1 which produces as an output the value VAVE as described previously. The voltage measuring circuit therefor determines the magnitude of the AC network supply voltage to be regulated. This circuit may use conventional techniques to measure the three phase average, single phase average, single phase RMS, etc. values of the AC network voltage. The preferred arrangement shown in FIG. 2 and FIG. 3 is utilized for most practical applications and produces the voltage average signal VAVE.

Referring now to FIG. 4, the circuit arrangement for a four signal VAR demand comparator 24 such as is shown in FIG. 2 is shown. In this case, a voltage divider including the resistive elements r1, r2, r3 and r4 is disposed electrically between ground and a voltage reference signal VART. Choice of the value VART or the values of the resistors r1 through r4 determine the VAR demand breakpoints at which new levels of capacitive current will be switched discretely into the circuit. The output signal VARD (representing VAR demand) from the error amplifier 22 is provided by way of a common line to the negative terminal of each of the comparator circuits CM1, through CM4. Each comparator circuit comprises an integrator INT with input resistors ra and rb for the reference voltage line VART and the signal line VARD, respectively. A feedback resistor rc is provided between the output of the integrator INT and the positive input terminal thereof. The integrator CM4 is shown in greater detail than the integrators CM1 and CM3 for purposes of simplicity of illustration. The integrator CM2 is purposely deleted for purposes of efficiency and simplicity of illustration. As the voltage VARD increases, the cross-over points on the comparators CM1, CM2, CM3, CM4, are reached in which case positive output signals BK1, BK2, BK3 and BK4 are provided. The presence of each of the output signals BK1 through BK4 is utilized by the decision logic for switching capacitor circuit 32 shown in FIG. 2 for causing the appropriate capacitors C1 through C4 to switch in as required. The VAR demand comparator therefor may be viewed as an n level comparator (where n indicates the number of capacitor banks used in each phase of the VAR generator). The latter comparator is used to determine the VAR demand points at which each capacitor bank is to be switched in or out of the circuit.

Figure 6:
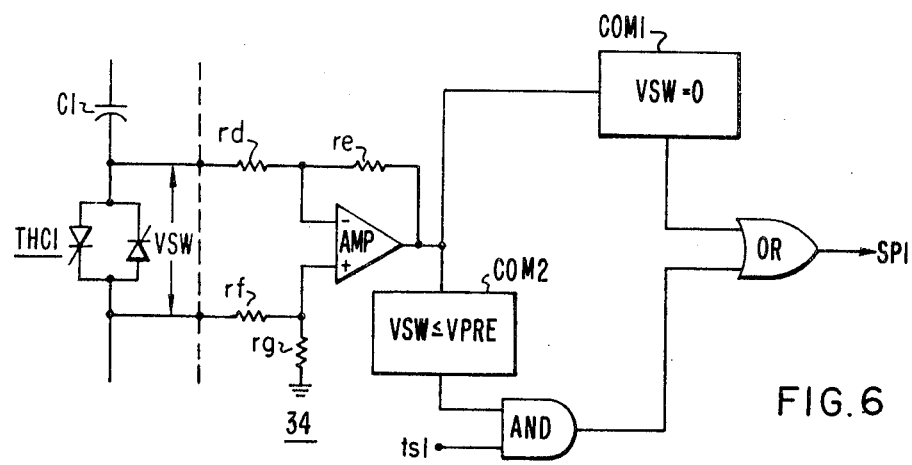
FIG. 6 shows a block diagram for the "capacitor switching time selector" of FIG. 2.

Referring now to FIG. 6, a portion of the capacitor switching time selector 34 is shown. For purposes of illustration, that portion of the time selector 34 shown is associated with the capacitive element C1 and the switch THC1. The capacitor switching time selector 34 is a circuit that monitors the voltage VSW across the solid state capacitor switch THC1 and provides a logic signal SP1 as output, when the voltage VSW is sufficiently low so that switching of the capacitor bank C1 is possible with a minimum of network transient. This is called transient free switching. The voltage VSW across the solid state switch THC1 is the difference between the capacitor voltage and the AC network supply voltage v. Theoretically, the correct instant of time to switch in a capacitor bank is when the voltage across the solid state switch is zero. That is, the AC network voltage v equals the capacitor voltage. At times, when the capacitor is overcharged due to network transients, this condition cannot be satisfied. In this case, the condition to be met is that the minimum switch voltage does not exceed a predetermined value VPRE, typically the peak value of the nominal AC voltage is used. Thus, the capacitor bank is allowed to be switched in if (a) the solid state switch voltage VSW is 0, that is, the capacitor voltage and the AC voltage v are equal, or (b) if the solid state switch voltage VSW is less than a prescribed value VPRE at a time tsl when the difference between the AC network voltage and the capacitor voltage is at a minimum. In order to accomplish this, a differential amplifier AMP is used in which the positive input thereto is provided from the midpoint of a voltage divider connected between ground and the non-capacitor side of the thyristor switch THC1. The voltage divider comprises the resistive elements rf and rg. The negative input to the differential amplifier is provided from the other side of the thyristor switch THC1 by way of a resistor rd. A feedback resistor re is provided between the negative input terminal of the amplifier AMP and the output terminal thereof. The output line from the amplifier AMP is provided concurrently to a first comparator COM1 and a second comparator COM2. The output of the second comparator is provided to the first input of an AND gate. The other input of the AND gate represents the signal tsl. The output of the AND gate and the output of the first comparator are provided to the two inputs of an OR gate, the output of which represents the signal SP1. If the voltage VSW across the thyristor switch THC1 is 0, the output of the amplifier will be 0 and the comparator COM1 will be actuated to provide a digital 1 to the OR gate thus causing a signal SP1 to be present. On the other hand, if the voltage VSW is greater than 0 but less than some predetermined value, the voltage at the output of the amplifier AMP will actuate the second comparator COM2 exclusively to provide an output signal which in turn is provided to one input of the AND gate. When the appropriate timing signal tsl is also present on the other terminal of the AND gate, an output will be provided to the OR gate to also cause the signal SP1 to be present. Consequently, it can be seen that the signal SP1 is present if the differential voltage VSW is equal to 0 or greater than 0 but still less than some predetermined value VPRE. The value VPRE is related to solid state switch voltage and the maximum AC network voltage.

Referring now to FIGS. 5A through 5E, plots of capacitor voltage, line voltage, and capacitive current for five different switching situations is shown. At FIG. 5A, a condition for switching at the zero crossing of AC network voltage v is illustrated. In this situation, when the AC network voltage is 0, the capacitor C1, for instance, is switched on allowing current ic to flow and allowing voltage vc which is essentially equal to the AC network voltage to be impressed across the capacitor C1. This condition typically exists at start-up or when the capacitor bank is allowed to be completely discharged. At FIG. 5B and FIG. 5C, the switching of positively and negatively charged capacitor banks, respectively, at the peak of the applied voltage is illustrated. Note that in FIG. 5B, the switching occurs on a positive peak of line voltage v and at FIG. 5C, the switcing occurs at a negative peak of line voltage v. Switching on is represented at SW1 and switching off is represented at SW2. Note that switching off also occurs at the appropriate positive and negative peaks respectively. At FIG. 5D, a condition when a discharging capacitor is switched in is illustrated. Note that switching in occurs at place SW1 where the capacitor voltage is less than the maximum value of the line voltage v. Switching out at SW2 occurs at the positive peak in this instance. Finally in FIG. 5E, the switching of an overcharged capacitor bank is illustrated. This illustrates the second condition described previously, the condition when the difference between the charge on capacitor and the maximum AC line voltage v is a minimum value VPRE. With respect to the waveforms as shown in FIG. 5, see 5D and 5E, the switching out of the capacitor at the position SW2 occurs for a disposition where either a negative or a positive charge, respectively, is required to be maintained on the capacitor.

Figure 11:
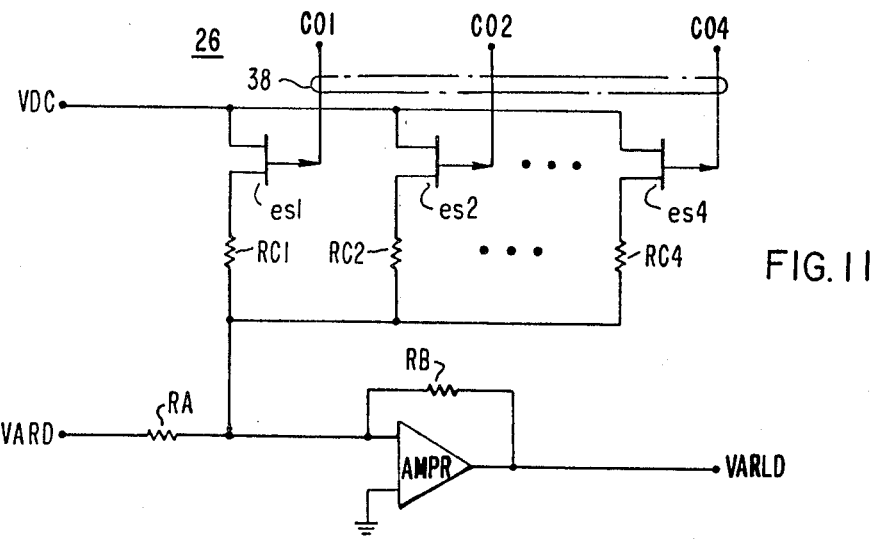
FIG. 11 shows a circuit diagram for the "error adjusting circuit" of FIG. 2.

Referring now to FIG. 11, apparatus and circuit elements suitable for constructing an error adjusting circuit 26 such as shown in FIG. 2 is illustrated. The error adjusting circuit 26 modifies the VAR demand signal VARD obtained from the error amplifier 22 in proportion to the VAR rating of the capacitor banks switched in. The modified error signal VARLD represents the VARS to be absorbed by the thyristor controlled reactor. This is an important part of the feed forward portion of the VAR generator 10. The error adjusting circuit 26 can be realized simply as a summing amplifier to the input of which DC current signals representing the VAR output of the individual capacitor banks are switched by analog switching devices es1, es2, etc. The analog switching devices are operated by the drive signals of thyristors derived in the decision logic to switch the capacitor banks. In FIG. 11, three sets of DC drive circuits are shown. Each one comprises an electronic switch, es1 for instance, and a current determining resistor RC1 for instance. Likewise, electronic switches ES2 through ES4 and current determining resistors RC2 through RC4 are also provided. One end of each of the resistors RC1 through RC4 are interconnected to each other and to one end of a resistive element RA. The common junction forms an input node for an amplifier AMPR. The voltage VDC for the summing networks may be provided from any convenient location and may be calibrated ahead of time to provide the correct value of current in each case. The signals CO1, CO2 through CO4 are provided to the control terminals of the electronic switches ES1, ES2, ES4, etc. to actuate those switches to provide the proper value of DC current as the capacitive elements are switched in and out. The net VAR demand is provided to the left at the node indicated as VARD. This is supplied as a DC current through the resistive element RA to the input node of the amplifier AMPR. The amplifier has a feedback resistor RB. The other input terminal of the amplifier AMPR is connected to ground and the output is the signal VARLD. As each new value of capacitance is switched in, the DC current on the input terminal of the amplifier AMPR increases incrementally thus causing the signal VARLD to increase incrementally thus alerting the error to firing angle converter to choose an appropriate value of α depending upon the level of the signal.

Figure 7:
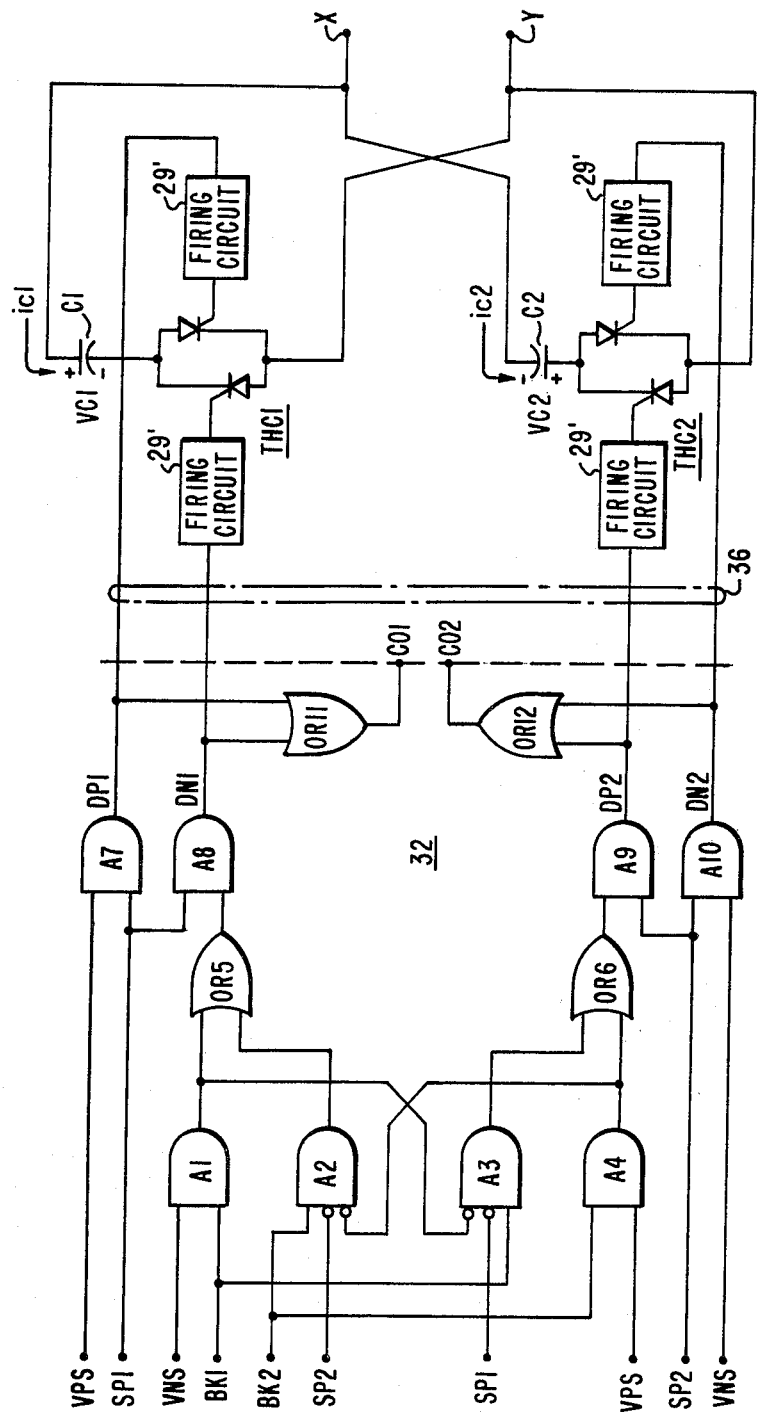
FIG. 7 shows a logic and circuit block diagram for the "decision logic for capacitor switching" module and appropriate capacitors and their firing circuits as shown in FIG. 2.
Figure 8:
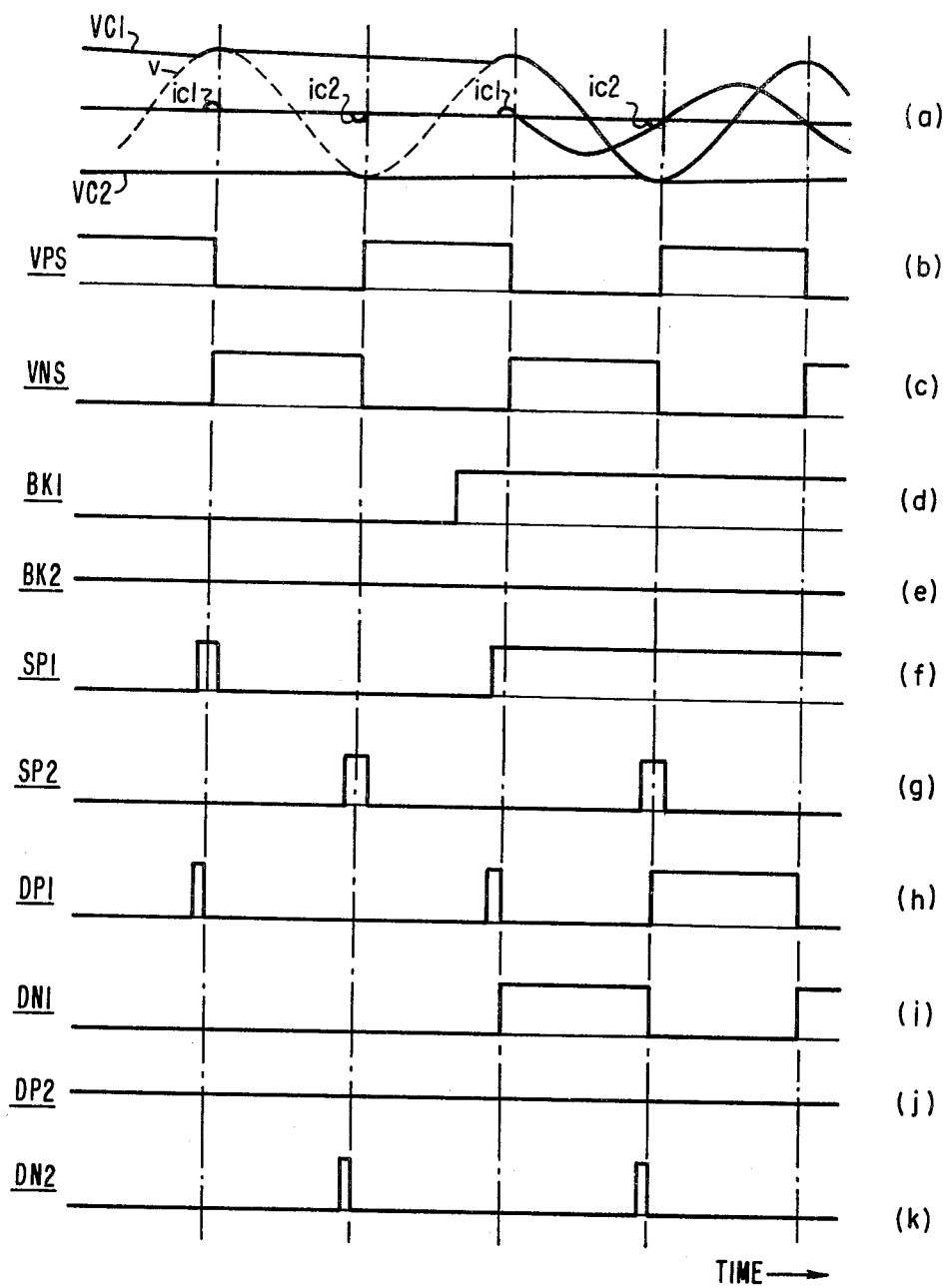
FIGS. 8A through 8K show plots of line currents, capacitor voltage and capacitor current as well as the logic levels for the apparatus of FIG. 7 for a first switching situation.

The decision logic for capacitor switching signal 32 is depicted in FIG. 7. Appropriate current and voltage relationships as well as digital timing signal relationships from other elements previously described are shown for three examples in FIGS. 8A through 8K, 9A through 9K, and 10A through 10K, respectively. The decision logic for capacitor switching circuit 26 comprises an input AND gate A1 to which the signals VNS and BK1 are provided. There is also provided an AND gate A2 to which the signals BK2, SP2 and the output of an amplifier A4 are provided. There is also provided an AND gate A3 to which the signals SP1, BK1 and the output of the AND gate A1 are provided. There is also provided an AND gate A4 to which the signals VPS and BK2 are provided. There is provided an AND gate A7 to which the signals VPS and SP1 are provided and an AND gate A8 to which the signal SP1 and the output of an OR gate OR5 are provided. There is an AND gate A9 to which is provided the output of an OR gate OR6 and the signal SP2. Also, there is an AND gate A10 to which is provided the signal SP2 and the signal VNS. The output of the AND gate A1 and the output of the AND gate A2 are provided as the two inputs for the OR gate OR5. In a like manner, the output of the AND gate A3 and the output of the AND gate A4 are provided as two inputs for the OR gate OR6. The output of the AND gate A7 represents the signal DP1. The output of the AND gate A8 represents the signal DN1. These signals are provided to the two inputs of an OR gate OR11, the output of which represents a signal CO1. The output of the AND gate A9 represents the signal DP2 and the output of the AND gate A10 represents the signal DN2. These signals are provided to two inputs of an OR gate OR12, the output of which is the signal CO2. Firing circuits 29' are shown for the capacitive element C1 and for the capacitive element C2. The signal DP1 is provided to the firing circuit 29' for controlling one of the thyristors of the bipolar thyristor pair THC1. The signal DN1 is provided to the firing circuit 29' for controlling the other thyristor of the bipolar thyristor pair THC1. During alternate half cycles, the thyristors are fired thus connecting the capacitor C1 across the terminals X and Y thus allowing appropriate current iC1 to flow. In a like manner, signals DP2 and DN2 are provided to the firing circuits 29' for the bipolar thyristor arrangement THC2 to interconnect the capacitive elements C2 into the circuit at an appropriate time to allow the current iC2 to flow. The voltage across the capacitive element C1 is designated VC1, the voltage across the capacitive element C2 is designated VC2. The lines 36, also shown in FIG. 2, are depicted clearly in FIG. 7. It will be noted that only a portion of the circuit diagram for the decision logic for capacitor switching circuit 32 is shown for purposes of simplicity of illustration. The decision logic for capacitor switching circuit 32 determines which capacitor banks should be switched in to satisfy the VAR demand. Since the capacitor banks may be charged alternately to the positive and negative peak of the AC network supply voltage v in order to obtain the fastest possible response, the decision logic has to select a capacitor bank with the voltage polarity that allows the earliest switching. One way this can be accomplished is illustrated schematically for two oppositely charged capacitor banks in FIG. 7. The positive charge on the capacitor bank C1 is maintained by firing the positive thyristor THC1 via AND gate A7 when signal SWP1 is a digital 1. Similarly, the negative charge on the capacitor bank C2 is maintained by firing the negative thyristor THC2 via AND gate A10 when the network voltage has a negative slope. VNS equal 1 and the signal SWP2 is a digital 1. In a like manner, the positively charged capacitor C1 is switched in when the negative thyristor THC1 is fired via AND gate A8 and a negatively charged capacitor C2 is switched in when the positive thyristor THC2 is fired via AND gage A9. The operation of the decision logic shown in FIG. 7 is illustrated under different conditions by the waveform shown in FIGS. 8 through 10.

FIGS. 8A through 8K illustrates the case where the VAR demand comparator is asking for a switching in of capacitor C1 close to the time instant at which such is permitted prior to the positive peak of the AC network voltage v. Signal drive DN1 is provided via gate AND1, gate OR5 and gate A8 to the firing circuit of thyristor TH1 as soon as signals VNS and SP1 become positive. The switching in of the capacitor C1 occurs at the positive peak of the AC voltage v. At the end of the first negative current half cycle, drive signal VP1 is provided via the AND gate A7 since at that time, both VPS and SWP1 are positive. The capacitor bank C1 is thus kept switched in by alternately providing signals DP1 and DN1 as long as the demand for bank 1 is positive that is, BK1 is positive. Note, however, that the capacitor bank C1 is always switched out at the positive peak of the voltage v since the drive signal DP1 is independent of the VAR demand signal BK1.

FIGS. 9A through 9K illustrate the case when the VAR comparator is asking for a switching in of the capacitor bank C1 just prior to the negative peak of the AC voltage v. At this time, the capacitor bank C1 cannot be switched in in a transient free manner since it is charged to the positive peak of the AC voltage v. Thus, it will be necessary either to wait until the AC voltage reaches its positive peak to switch in the capacitor C1 or to switch in the capacitor bank C2 which has the correct negative charge. Instead of bank C1, the decision logic optimizes for the second alternative of switching in the capacitor bank C2 in order to provide the fastest possible response time. Subsequently, capacitor bank C2 is interchanged with bank C1. This interchanging is unimportant in the simple two bank example considered. However, in practice, it is often desired to switch in the capacitor banks in some preassigned order for the purpose, for example, of controlling the resonance between the capacitor banks and the AC network. To execute the interchange, capacitor bank C1 is switched in one half a cycle after the switching in of the bank C2 occurs. In order to maintain the predesignated charge on capacitor bank C2 (which is important in a multibank compensating system to avoid the possibility of ending with switchable capacitor banks all charged to the same polarity), bank C2 is switched out at the negative peak of the AC voltage v. For this reason, both banks C1 and C2 are switched in for a half cycle interval. The surplus capacitive current is cancelled by the thyristor controlled inductor L depicted best in FIG. 2. overcompensation as desired.

Figure 9:
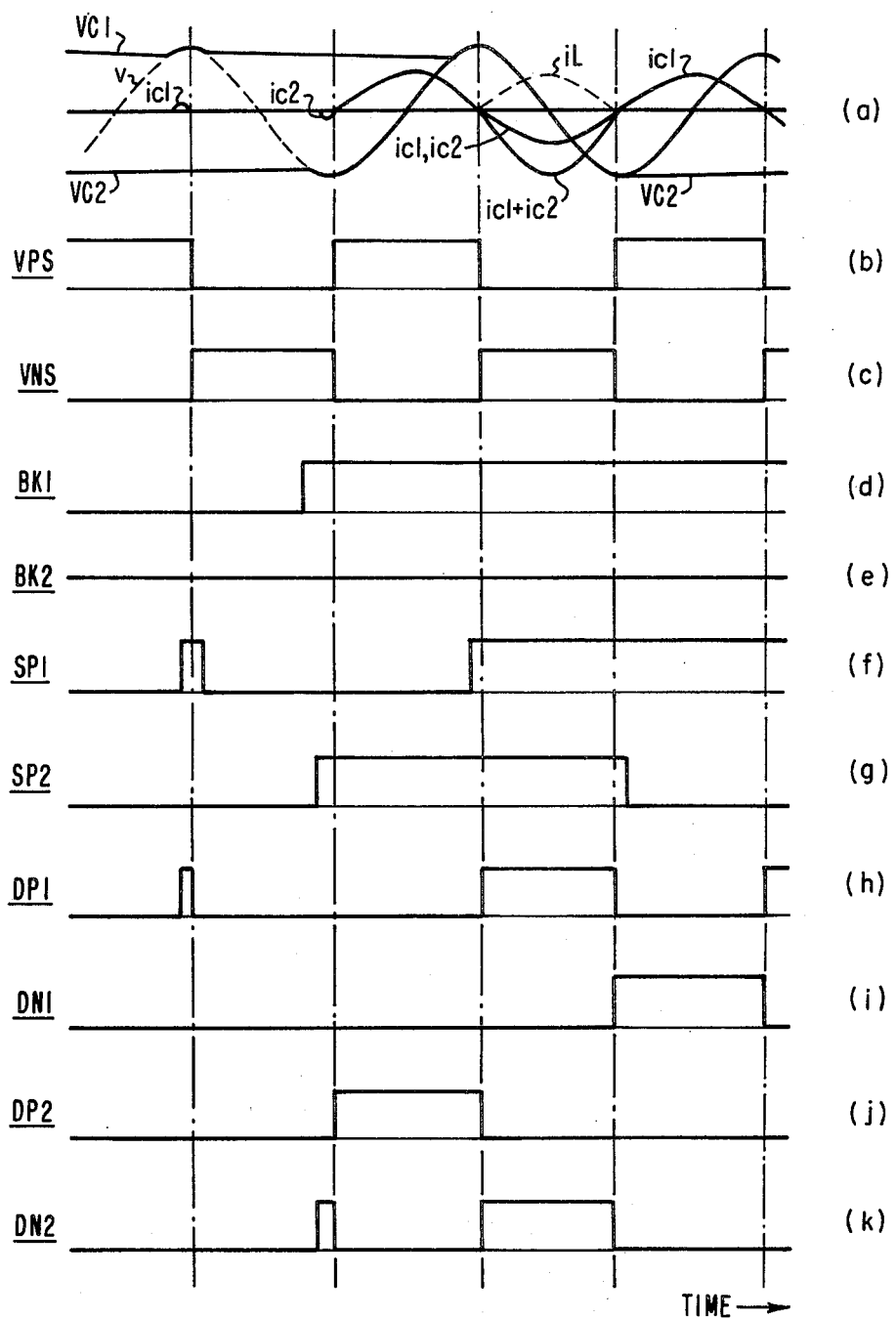
FIGS. 9A through 9K show plots similar to that shown in FIGS. 8A through 8K but for a second switching situation.

Referring to FIGS. 7 and 9 concurrently, as a response to the VAR demand signal BK1, signal drive DP2 is provided via AND gate A3, OR gate OR6 and AND gate A9. This causes the switching in of the capacitor bank C2 with the negative peak of the AC voltage v soon after the demand signal BK1 has appeared. However, one half cycle later, capacitor bank C1 is also switched in by providing the negative drive signal DN1 via the AND gate A1, the OR gate OR5 and the AND gate A8. The capacitor bank C2 is then switched out at the subsequent negative voltage peak v and the capacitor bank C1 is kept switched in as previously described.

Figure 10:
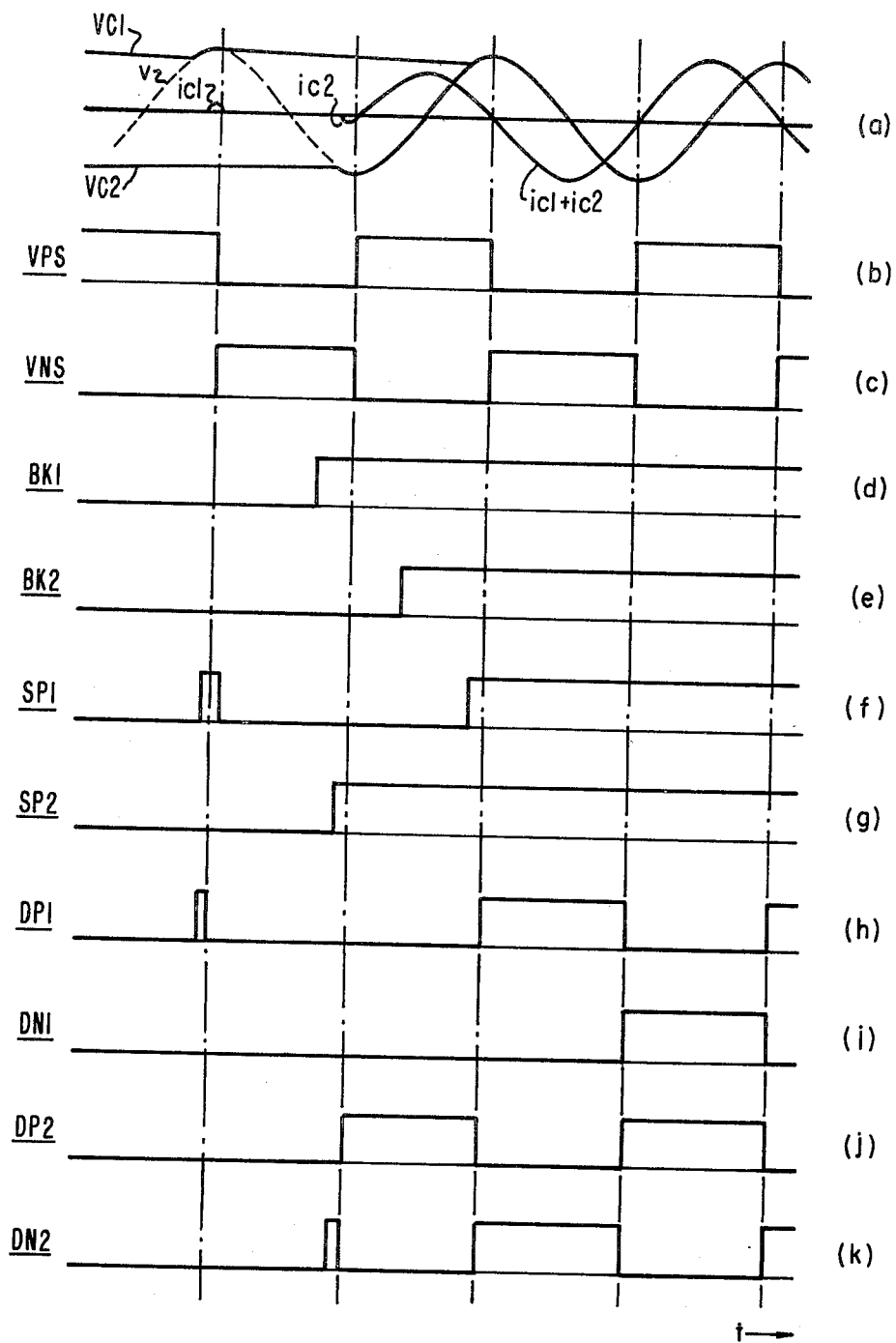
FIGS. 10A through 10K show plots similar to those shown in FIGS. 8A through 8K and 9A through 9K except for a third switching situation.

FIG. 10 illustrates the third case where the VAR demand comparator is asking for successive switching in of capacitor bank C1 and C2. Because signal BK1 appears prior to the negative voltage peak v, the first capacitor bank C2 and subsequently the capacitor bank is switched in as described above. Since in the meantime, demand signal BK2 has also appeared, the decision logic for capacitor switching circuit 32 will keep both banks switched in. The operation of the decision logic has been described and illustrated in conjunction with two capacitor banks C1 and C2. By use of the principals described above, logic circuitry for the control of any number of capacitor banks can be devised easily. For example, combining three sets of the circuits shown in FIG. 7, the decision logic can be extended to control four capacitor banks. One circuit controls banks C1 and C2, the other controls banks C2 and C3, and the third controls banks C3 and C4. The capacitor banks C1 and C3 are charged positively and the banks C2 and C4 may be charged negatively. The VAR demand signals can be indicated as shown in FIG. 2 and may include signals BK1, BK2, BK3 and BK4. Thus, until capacitor C1 is switched in, the decision logic will choose the path for the fastest possible response among the banks C1 positive and C2 negative. When capacitor bank C1 is already switched in, the decision logic will choose among banks C2 negative and C3 positive to respond in the fastest possible way to subsequent VAR demands. When the capacitor bank C2 is switched in, the decision logic will choose among capacitor banks C3 positive and C4 negative. If two capacitor banks were requested at the same time, the decision logic would switch in similarly charged banks at the earliest possible time and would then interchange one of them with the other or with an unused bank in order to keep the stand-by capacitor banks oppositely charged. The principals described hereinabove can be extended to any number of capacitor banks depending upon the practical limitations of the installation thereof among other things. For large systems using several capacitor banks, the decision logic may be more economically realized by utilizing a microprocessor or similar programmable logic type arrangement.

Figure 12:
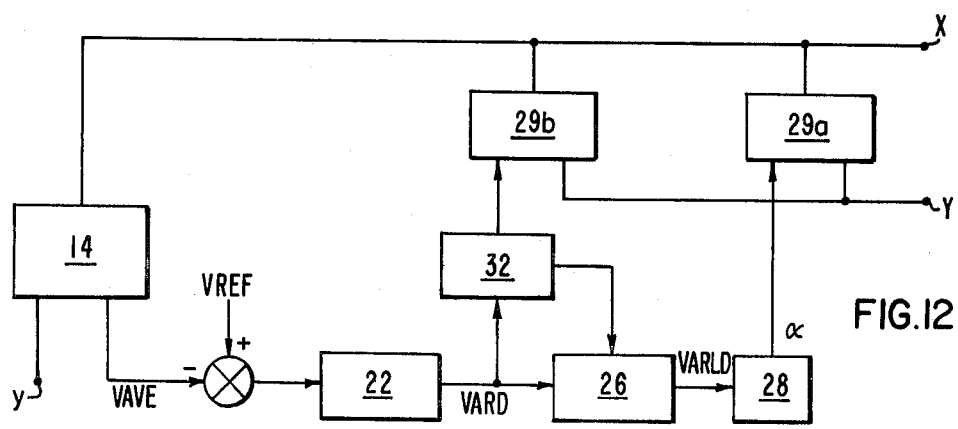
FIG. 12 shows another block diagram in greatly simplified form, for the block diagram shown in FIG. 2.

Referring to FIG. 12, a greatly simplified version of the block diagram of FIG. 2 is shown. In this case, it can be seen that the terminals X and Y are utilized to provide a voltage signal to element 14 which in turn provides a voltage average signal VAVE which is then supplied to the negative terminal of a summing amplifier 20. The reference voltage VREF is supplied to the positive terminal of the summing amplifier 20. The output of the summing amplifier is provided to an error amplifier 22 which produces the demand output signal VARD. The demand output signal may be utilized in conjunction with appropriate decision logic 32 to fire a capacitive circuit designated at 29b for providing net capacitive VARS or may be utilized with an inductive circuit shown at 29a for providing net inductive VARS. In the latter case, an output signal is provided from the summing amplifier 26. The output signal is designated VARLD and is provided to a firing angle determining circuit 28 which produces an angle signal α which is related to the conduction interval of the thyristors which control inductors. In a case where the inductor circuit 29a is utilized to fine tune capacitive VARS, the signal VARLD is shown derived from the signal VAR and from feed forward output of the decision logic 40.

It is to be understood with respect to the embodiments of this invention that the number of inductive elements and capacitive elements is not limiting. It is to be understood that the number of discrete VAR steps available may be relatively large even though control over a continuous range is not obtainable without utilizing the cooperating inductive elements. It is also to be understood that the particular circuit arrangement for the functional block shown in FIG. 2 in many instances are related to preferred embodiments and are not limiting provided the function of closed loop control with feed forward adjustment is provided. It is also to be understood that the synchronous timing generator 18 and the error to firing angle converter 28 may be of the type described in the previously mentioned U.S. Pat. No. 3,999,117.

The apparatus taught with respect to the embodiments of this invention have many advantages. One advantage lies in the fact that continuous control may be obtained in both the leading and lagging VAR regions for a static VAR generator. Furthermore, continuous control may be had with the utilization of hysteris and continuous control may be had with effective provision for reducing switching transients. Another advantage lies in the fact that the static VAR generator described herein and the control system therefor may be utilized to provide a static VAR generator that uses smaller circuit elements than would be normally required if a VAR generator of the type using a fixed capacitor and a thyristor control conductor such as described in the prior art were used.

I claim:

1. A VAR generator of the type which provides a controlled conduction path for reactive current between two conductors in an electrical system, comprising:

(a) a plurality of separate independently switchable fixed capacitance means disposed in parallel circuit relationship as part of said conduction path for providing any one of a plurality of predetermined fixed levels of capacitive current in said conduction path during a predetermined increment of time, each said capacitance means having disposed thereacross a voltage at the time of switching;

(b) continuously variable inductance means disposed as part of said conduction path for providing any level of inductive current within a range of inductive currents in said conduction path during a predetermined increment of time; and (c) control means interconnected with said electrical system, said capacitance means and said inductance means for determining the magnitude of said reactive current as a function of a circuit variable of said electrical system, for sensing the voltage across each of said capacitance means, for choosing a combination of said capacitance means which provides that predetermined level of fixed capacitive current which is closest in value but larger than said determined magnitude of reactive current, for switching into a state of conduction only those capacitance means of said combination for which said sensed voltage is appropriate for generally transient free switching during said increment of time, said remainder of said capacitance means being switched in at a later time when the voltage thereacross is appropriate, and for cooperating with said inductance means to choose a value of cancelling inductive current which when combined with said capacitive current will cancel a sufficient portion of said capacitive current to make said net reactive current generally equal in magnitude to said determined magnitude only if all of said combination of capacitance means are switched into a state of conduction otherwise no inductive current being provided.

2. The combination as claimed in claim 1 wherein said increment of time comprises the period of one half cycle of alternating voltage in said electrical system.

3. The combination as claimed in claim 2 wherein said alternating voltage has a frequency of 60 hz.

4. The combination as claimed in claim 2 wherein said alternating voltage has a frequency of 50 hz.

5. The combination as claimed in claim 1 wherein said continuously variable inductance means comprises an inductor connected in series circuit relationship with a gated switch, the gate terminal of said gated switch comprising a control terminal, said level of inductive current being determined by the conduction interval of said gated switch as controlled by said control means.

6. The combination as claimed in claim 1, wherein said capacitance means comprise a plurality of capacitors each of which is connected in series circuit relationship with a controlled switch, each series combination of controlled switch and capacitor being connected in parallel circuit relationship with the others, each controlled switch being interconnected with said control means, said control means being capable of actuating any combination of said controlled switches to the on state to place the corresponding capacitors into conduction to provide said predetermined fixed levels of capacitive current.

* * * * *